United States Patent [19]

Plattner

[11] Patent Number: 4,873,789
[45] Date of Patent: Oct. 17, 1989

[54] SOIL STERILIZER

[76] Inventor: Andrew J. Plattner, 4663 Hedgewood Dr., Birmingham, Mich. 48010

[21] Appl. No.: 5,151

[22] Filed: Jan. 20, 1987

[51] Int. Cl.⁴ .............................................. A01B 77/00
[52] U.S. Cl. ................................. 47/1.42; 47/DIG. 10
[58] Field of Search ...................... 47/1.44, 1.3, 1.42, 47/DIG. 8, DIG. 10; 378/69, 64, DIG. 12; 250/253, 255, 455.1

[56] References Cited

U.S. PATENT DOCUMENTS

| | | |
|---|---|---|
| 1,218,850 | 3/1917 | Fry . |
| 1,981,583 | 11/1934 | Craig .......................... 99/11 |
| 2,775,174 | 12/1956 | Petrick ....................... 97/10 |
| 2,910,372 | 10/1959 | Ruskin ....................... 106/89 |
| 2,992,980 | 7/1961 | Suttle, Jr. ................... 204/193 |
| 3,197,640 | 7/1965 | Speas ......................... 250/106 |
| 3,496,362 | 2/1970 | Kirkpatrick et al. .......... 250/106 |
| 3,527,940 | 9/1970 | Balanca et al. .............. 250/44 |
| 3,740,557 | 6/1973 | Kaushansky et al. .......... 250/106 R |
| 3,758,273 | 9/1973 | Johnston ..................... 21/54 R |
| 3,802,020 | 4/1974 | Stone et al. ................. 47/1.42 X |
| 3,940,885 | 3/1976 | Gray .......................... 47/58 |
| 4,020,352 | 4/1977 | Mahler et al. ................ 250/436 |
| 4,048,509 | 9/1977 | Sieber ........................ 250/522 |
| 4,092,800 | 6/1978 | Wayland, Jr. et al. ........ 47/1.3 |
| 4,151,419 | 4/1979 | Morris et al. ................ 378/69 |
| 4,420,901 | 12/1983 | Clarke ........................ 47/1.44 |

FOREIGN PATENT DOCUMENTS

| | | | |
|---|---|---|---|
| 8303505 | 5/1985 | Netherlands ................. | 47/1.44 |
| 270114 | 8/1970 | U.S.S.R. ..................... | 47/DIG. 8 |

OTHER PUBLICATIONS

Jackson et al, "Gamma Irradiation and the Microbial Population of Soil at Two Water Contents", from Soil Science Society of America Proceedings, vol. 31, No. 4, Jul.-Aug. 1967, pp. 491–494.

*Primary Examiner*—Robert A. Hafer
*Assistant Examiner*—Danton D. DeMille
*Attorney, Agent, or Firm*—Basile and Hanlon

[57] ABSTRACT

Disclosed is an apparatus for and a method of soil sterilization to control undersirable biotica resident therein. The apparatus for soil sterilization includes a shielded chamber with a baffled inlet and a baffled outlet formed on side walls thereof. Means for generating electromagnetic energy in the gamma region is provided, and the rays emitted therefrom are contained within the shielded chamber. A conveyor means such as a conveyor belt continuously and sequentially conveys portions of unsterilized soil from a tillable field into the baffled inlet, then through the energized chamber, and thence out of the baffled outlet. After exposure to the gamma rays contained within the chamber, undesirable biotica resident in the unsterilized soil are significantly reduced by death and morbidity. The apparatus may further comprise a scalping blade for scooping up soil from a tillable field, a screening device to screen out undesirable debris, a discharge means to discharge the sterilized soil back unto the tillable field, agitating means to agitate and turn the soil within the shielded chamber, and a monitoring device to measure the radiation level of the sterilized soil. A method of sterilizing soil by application of gamma rays is also disclosed.

4 Claims, 1 Drawing Sheet

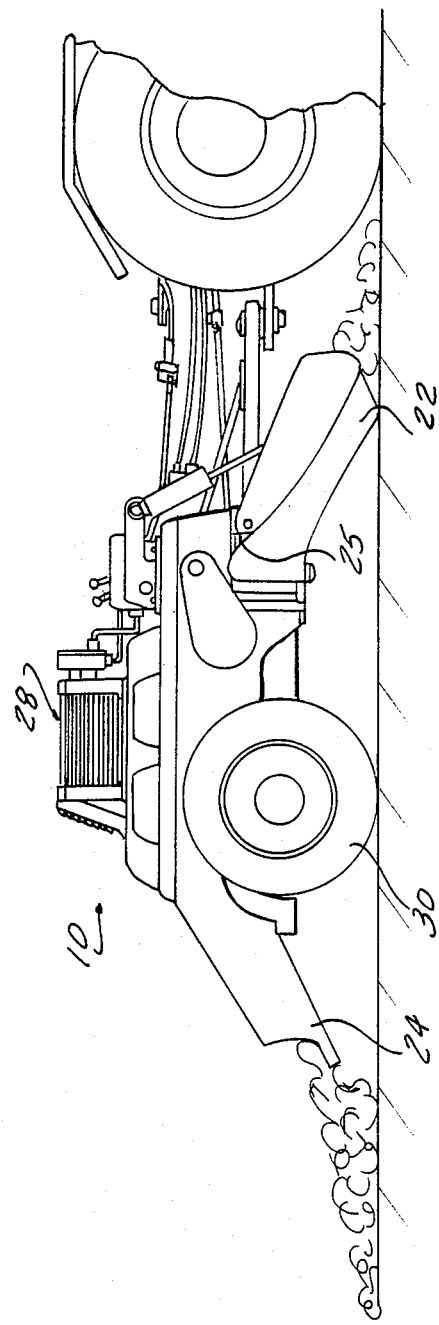
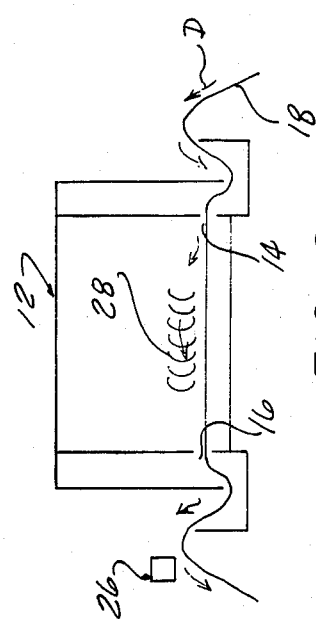

SOIL STERILIZER

BACKGROUND OF THE INVENTION

Field of the Invention

This invention relates to a method of soil sterilization to control undesirable biotica resident therein, such as weeds, nematodes, spores and fungi, in open tillable soil areas and more particularly to soil sterilization by the application of gamma rays to the tillable areas.

There has been a long felt need for an effective method of controlling undesirable biotica in tillable soils which does not have adverse ecological consequences. While undesirable vegetation and pests may be controlled by the application of chemicals such as pesticides and herbicides, these chemicals leave harmful residues which may persist for long periods of time and lead to unacceptable buildups of breakdown products in those animals at the top of the food chain.

Other present day methods include mechanical devices and controlled burning. The mechanical devices are either ineffective or are expensive to apply. It is also difficult to use a mechanical method such as cultivation in rainy seasons, and such cultivation can contribute to soil erosion. Controlled burnings generally result in an unacceptably high level of environmental pollution.

It has been proposed to control undesirable vegetation in tillable areas by the application of microwave energy thereto. U.S. Pat. No. 4,092,800 proposes applying energy at an output frequency of 300 megahertz to 300 gigahertz to achieve vegetation control. A method for carrying out the application of the microwave energy involves generating an electromagnetic wave of the appropriate frequency, subjecting an area within which vegetation is to be controlled to the electromagnetic wave emission, and reflecting the wave emission after it has passed through the area back into the area of vegetation control to achieve an energy density in the range of 150 Joules/cm$^2$ to approximately 300 Joules/cm$^2$. It is claimed that microwave energy of this energy density is sufficient to cause the death or debilitation of the vegetation without raising the temperature of the soil to undesirable levels.

While microwave energy can be used to control vegetation, this method is effective only if either the energy density of the microwaves is very high or if the microwaves are applied to a particular area for time periods as long as 32 seconds. Thus, the method disclosed in U.S. Pat. No. 4,092,800 is impractical because of the excessively high energies or long time periods required to achieve lethal dosages.

Thus, it would be desirable to provide control of undesirable biotica in the soil which involves neither the environmental dangers posed by chemical pesticides or controlled burning, or the expense and impractibility of mechanical methods. It would also be desirable to use electromagnetic energy of a frequency such that brief application of the energy would achieve satisfactory results.

SUMMARY OF THE INVENTION

An apparatus for and method of soil sterilization to control undesirable biotica resident therein is disclosed and claimed. The apparatus for soil sterilization comprises in combination: a suitably shielded chamber with a baffled inlet and a baffled outlet; means for generating electromagnetic energy in the gamma region, i.e., having a frequency in the range of from 60 to 3,000,000 gigaHertz, said energy being confined within the chamber; and a conveyor means such as a conveyor belt to convey continuously portions of unsterilized soil from a tillable field into the baffled inlet, thence through the energized chamber, and thence out of the baffled outlet. After exposure to the gamma rays contained within the chamber for approximately three seconds, the undesirable biotica resident in the unsterilized soil will be significantly reduced by death and disability.

It is contemplated that the apparatus will be provided with wheels such that it is capable of being moved along the rows of a tillable field. The apparatus may either be self propelled or may be hooked to a means for propulsion, such as a tractor of conventional design.

The apparatus may comprise a number of additional features. Unsterilized soil may be introduced onto the conveyor means by a scalping blade which is set at a predetermined depth to continuously scoop up the first four to six inches of soil from the tillable field. Most undesirable soil biotica are present in the top four inches. A screening device may be provided which intercepts the unsterilized soil on the conveyor belt and selectively removes objects such as sticks, stones, and other debris which is too large to pass therethrough. A discharge means may be provided for discharging the sterilized soil back on to the tillable field. Additionally, means of agitating and turning the soil while it is in the energized chamber may be provided. Additionally, a means of monitoring the radiation level of the sterilized soil may also be provided.

The method of the instant invention for sterilizing soil comprises the steps of: generating electromagnetic energy having a frequency in the gama region for emission from an energy generator; providing a shielded chamber with a baffled inlet and a baffled outlet to contain the generated electromagnetic energy; continuously conveying portions of soil from a top layer of a tillable field through the baffled inlet for exposure to the electromagnetic energy for a sufficient period of time to cause reduction in the number of viable undesirable biotica resident therein; and continuously conveying the exposed soil from the chamber via the baffled outlet.

BRIEF DESCRIPTION OF THE DRAWINGS

The various features, advantages and other uses of the present invention will become more apparent by referring to the following detailed description and drawings in which:

FIG. 1 is a schematic representation of a soil sterilizing apparatus of the instant invention hitched to a conventional tractor; and FIG. 2 is a schematic representation of a portion of the interior of the apparatus shown in FIG. 1 illustrating the arrangement of chamber, conveyor and baffled inlet and outlet.

DESCRIPTION OF THE PREFERRED EMBODIMENTS

Throughout the following description and drawings, identical reference numbers are used to refer to the same components shown in multiple figures of the drawing. Referring now to FIG. 1, there is depicted schematically a soil sterilizing apparatus 10 of the present invention shown hitched to a conventional tractor. The apparatus 10 is depicted being towed across a tillable field 13. Various features of the apparatus 10 which are conventional, such as the hitch, the shift levers, the generator, the hydraulics etc., are well known prior art devices and are not discussed in detail.

Disposed inside apparatus 10 is a shielded chamber 12 with a baffled inlet 14 and a baffled outlet 16 disposed on opposite sidewalls of shielded chamber 12, as depicted schematically in FIG. 2. A conveyor means such as conveyor belt 18 is disposed through baffled inlet 14, shielded chamber 12 and baffled outlet 16. Conveyor belt 18 moves in the direction indicated by arrow D, thereby conveying soil carried thereon through the chamber 12. The depiction of the baffling in FIG. 2 is for illustration purposes only, and any baffling system known in the prior art, such as that depicted in U.S. Pat. No. 3,740,557, can be used to shield the operator of the apparatus of the present invention from emission of harmful rays. For example, although not depicted, a shield could be interposed between the operator of the tractor and the apparatus 10.

A gamma ray emitter (not shown) emits energy for containment within shielded chamber 12. The gamma ray emitter is disposed within shielded chamber 12. Alternatively, the emitter could be disposed substantially outside of shielded chamber 12, with provision made for the containment of the gamma rays emitted by the emitter within shielded chamber 12. If the gamma rays emitted from the emitter are emitted from multiple points inside the chamber 12, this arrangement will facilitate equal exposure to the gamma rays of all the particles of soil passing through the apparatus 10.

In a preferred embodiment of the apparatus of the instant invention, the soil sterilizer 10 further comprises a number of structures depicted in FIGS. 1 and 2. A scalping blade 22 is disposed along the front portion of apparatus 10 for removing soil from a tillable field to a predetermined depth for deposit on the conveyor means 18. Since undesirable biotica resident in the top four inches of tillable soil have the most adverse impact on crop yields, scalping blade 22 should be set so as to scoop up approximately four to six inches off the top of tillable field 13.

A screening device 25 for selective removal of objects from the soil may be disposed at some point along conveyor means 18 medial of scalping blade 22 and baffled inlet means 14. Screening device 25 will selectively remove objects of a size larger than a predetermined value, such as sticks, rocks, or other foreign objects.

Shown disposed at the rear end of apparatus 10 is discharge means 24. Discharge means 24 allows the sterilized soil which has been eradiated in shielded chamber 12 to be deposited back on to tillable field 13. As shown in FIG. 2, a sensing means 26 may be disposed along conveyor means 18 in a position medial to baffled exit 16 and discharge means 24. By the use of sensor means 26, the radiation level of the sterilized soil may be measured prior to discharge. If the radiation level is below a predetermined value, the operator of soil sterilizer 10 may make appropriate adjustments to increase the energy level of the emitted gamma rays present in shielded chamber 12.

To facilitate the eradiation of the soil as it passes on conveyor means 18 through shielded chamber 12, agitation means 28 may be provided. Agitation means 28 will turn and agitate the soil to equally expose to the eradiation all particles thereof.

In operation, soil sterilizer 10 is hitched to a conventional tractor and driven through tillable field 13 at a rate of approximately 4 miles per hour. It is estimated that if the scooped up soil passes through an approximately 16 foot shielded chamber, it will be exposed to 300 roentgens of gamma rays for a total of about three seconds. Exposure at this radiation level for this period of time is sufficient to cause significant death and morbidity of undesirable biotica.

I claim:

1. An apparatus for soil sterilization to control undesirable biotica resident therein, comprising in combination:

a shielded chamber with a baffled inlet and a baffled outlet;

means for generating electromagnetic energy having a frequency in the range of from 60 to 3,000,000 gigaHertz, said energy being contained within the chamber;

a conveyor means to continuously convey portions of unsterilized soil into the baffled inlet, through the chamber and out the baffled outlet, whereby the soil is exposed to the electromagnetic energy within the chamber for a sufficient duration to cause significant death and disability of the undesirable biotica resident therein;

means whereby the apparatus is mounted on wheels and may be moved across portions of a tillable field;

a scalping blade for removing soil from a tillable field to a predetermined depth for deposit on the conveyor means;

a screening device between the scalping blade and baffled inlet for selective removal of objects from the soil of a size larger than a predetermined value;

means for discharging the sterilized soil back on to the tillable field;

means for measuring the radiation level of the sterilized soil immediately prior to discharge; and a power plant capable of powering the generating means with an output capacity of at least 300 roentgens.

2. The apparatus of claim 1 further comprising means for propelling the movable apparatus.

3. A method of sterilizing soil to control undesirable biotica resident therein, comprising the steps of:

generating electromagnetic energy having a frequency in the range from 60 to 3,000,000 gigaHertz for emission from an energy generator;

providing a power plant capable of powering the energy generator with an output capacity of at least 300 roentgens;

providing a mobile platform shielded chamber with a baffled inlet and outlet to contain the generated electromagnetic energy;

removing soil from the tillable field to a predetermined depth for continuous conveyance into the shielded chamber;

selectively removing objects from the soil of a size larger than a predetermined value;

continuously conveying portions of soil from the top layer of a tillable field through the baffled inlet for exposure to the electromagnetic energy contained within the chamber for a sufficient duration to cause significant death and disability of the undesirable biotica resident therein;

continuously conveying the sterilized soil from the chamber via the baffled outlet;

measuring the radiation level of the sterilized soil;

discharging the sterilized soil back onto the tillable field;

wherein the process of removing the soil, screening it, conveying it into the chamber, sterilizing it with electromagnetic energy, discharging it from the chamber, measuring its radiation level, and discharging it back onto the tillable field is performed by means of a wheeled apparatus which is moved across portions of a tillable field.

4. The method of claim 3 further comprising the step of providing means for propelling the wheeled apparatus.

* * * * *